US012772183B2

(12) United States Patent
He

(10) Patent No.: US 12,772,183 B2
(45) Date of Patent: Oct. 20, 2026

(54) WIRELESS COMMUNICATION METHODS, TERMINAL DEVICE AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 575 days.

(21) Appl. No.: 17/528,098

(22) Filed: Nov. 16, 2021

(65) Prior Publication Data

US 2022/0078731 A1 Mar. 10, 2022

Related U.S. Application Data

(63) Continuation of application No. PCT/CN2019/091415, filed on Jun. 14, 2019.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 24/10* (2013.01); *H04W 52/242* (2013.01)

(58) Field of Classification Search
None
See application file for complete search history.

(56) References Cited

U.S. PATENT DOCUMENTS

2019/0246410 A1* 8/2019 Zhang ............... H04W 72/0446
2020/0029238 A1* 1/2020 Si .......................... H04W 24/10
(Continued)

FOREIGN PATENT DOCUMENTS

CN 108134659 A 6/2018
CN 108632007 A 10/2018
(Continued)

OTHER PUBLICATIONS

3GPP TS 38.213 V15.2.0 (Jun. 2018); 3rd Generation Partnership Project; Technical Specification Group Radio Access Network; NR; Physical layer procedures for control (Release 15).
(Continued)

*Primary Examiner* — Scott M Sciacca
(74) *Attorney, Agent, or Firm* — Young Basile Hanlon & MacFarlane, P.C.

(57) ABSTRACT

Wireless communication methods, a terminal device, and a network device are provided. A wireless communication method includes the following. A terminal device receives configuration information of a pathloss reference signal transmitted by a network device, where the configuration information of a pathloss reference signal includes synchronization signal block (SSB) indication information, the SSB indication information is an SSB position index or an SSB quasi-co-location (QCL) index, and the SSB indication information is used for determining a target pathloss reference signal. The terminal device measures the target pathloss reference signal to determine a path loss between the terminal device and the network device.

16 Claims, 3 Drawing Sheets

200

(51) Int. Cl.
*H04W 24/10* (2009.01)
*H04W 52/24* (2009.01)

(56) References Cited

U.S. PATENT DOCUMENTS

| | | | | |
|---|---|---|---|---|
| 2020/0068497 A1* | 2/2020 | Gong | .................. | H04W 52/242 |
| 2020/0236574 A1* | 7/2020 | Ohuchi | .................... | H04L 5/005 |
| 2020/0413356 A1* | 12/2020 | Wang | .................. | H04W 72/046 |
| 2022/0150013 A1* | 5/2022 | Huang | ................. | H04J 11/0079 |
| 2022/0159596 A1* | 5/2022 | Kim | ..................... | H04B 17/336 |
| 2022/0210720 A1* | 6/2022 | Harada | ............... | H04L 27/2692 |
| 2022/0330173 A1* | 10/2022 | Matsumura | ........... | H04L 5/0051 |

FOREIGN PATENT DOCUMENTS

| | | | | |
|---|---|---|---|---|
| CN | 108809574 A | 11/2018 | | |
| CN | 109041199 A | 12/2018 | | |
| CN | 109392144 A | 2/2019 | | |
| CN | 109475001 A | 3/2019 | | |
| CN | 109803362 A | 5/2019 | | |
| WO | 2018127022 A1 | 7/2018 | | |
| WO | 2018199074 A1 | 11/2018 | | |
| WO | WO-2018195777 A1 * | 11/2018 | ........... | H04B 17/373 |
| WO | 2018228437 A1 | 12/2018 | | |

OTHER PUBLICATIONS

3GPP TS 38.331 V15.2.1 (Jun. 2018); 3rd Generation Partnership Project; Technical Specification Group Radio Access Network; NR; Radio Resource Control (RRC) protocol specification (Release 15).
3GPP TSG RAN meeting #81; Gold Coast, Australia, Sep. 10-13, 2018; RP-181704.
International Search Report with English Translation for PCT/CN2019/091415 mailed Mar. 13, 2020.
Chinese Notification to grant Patent Right for Invention with English Translation for CN Application 202210060097.X mailed Jun. 16, 2023. (10 pages).
Communication pursuant to Article 94(3) EPC for EP Application 19933027.5 mailed Nov. 4, 2022. (5 pages).
Extended European Search Report for EP Application 19933027.5 mailed Mar. 24, 2022. (10 pages).
Vivo, Discussion on enhancements to initial access procedure, 3GPP TSG RAN WG1 #97, R1-1906131, May 13-17, 2019. (9 pages).
Spreadtrum Communications, Discussion on initial access and mobility in NR-U, 3GPP TSG RAN WG1 Meeting #97, R1-1906375, May 13-17, 2019. (13 pages).
First Office Action with English Translation for corresponding CN Application No. 202210060097.X dated Mar. 8, 2023.

* cited by examiner

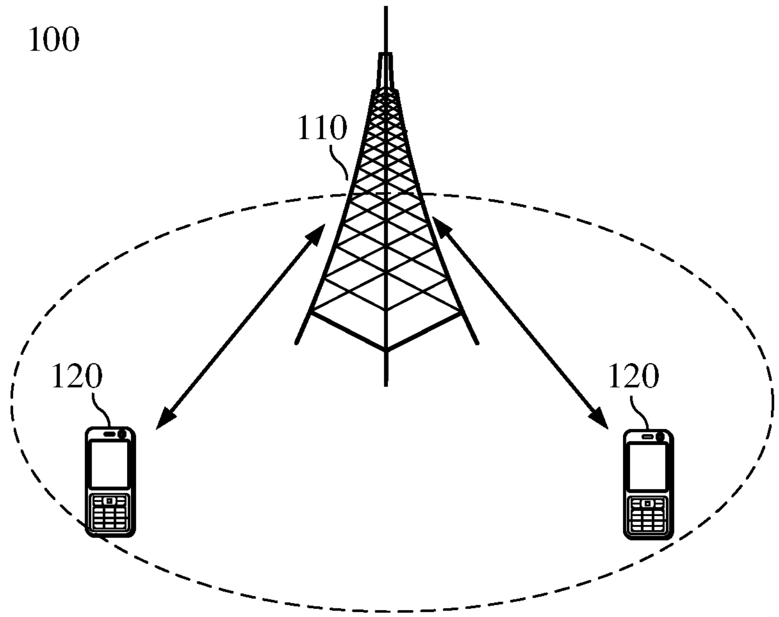

FIG. 1

200

A TERMINAL DEVICE RECEIVES CONFIGURATION INFORMATION OF A PATHLOSS REFERENCE SIGNAL TRANSMITTED BY A NETWORK DEVICE, WHERE THE CONFIGURATION INFORMATION OF A PATHLOSS REFERENCE SIGNAL INCLUDES SSB INDICATION INFORMATION, THE SSB INDICATION INFORMATION IS AN SSB POSITION INDEX OR AN SSB QCL INDEX, AND THE SSB INDICATION INFORMATION IS USED FOR DETERMINING A TARGET PATHLOSS REFERENCE SIGNAL — S210

THE TERMINAL DEVICE MEASURES THE TARGET PATHLOSS REFERENCE SIGNAL TO DETERMINE A PATH LOSS BETWEEN THE TERMINAL DEVICE AND THE NETWORK DEVICE — S220

FIG. 2

WIRELESS COMMUNICATION METHODS, TERMINAL DEVICE AND NETWORK DEVICE

CROSS-REFERENCE TO RELATED APPLICATION(S)

This application is a continuation of International Application No. PCT/CN2019/091415, filed on Jun. 14, 2019, the entire disclosure of which is incorporated herein by reference.

TECHNICAL FIELD

This disclosure relates to the field of communication, and more particularly to wireless communication methods, a terminal device and a network device.

BACKGROUND

In a new radio (NR) system, a network device can configure a pathloss reference signal for a terminal device, such that the terminal device can measure the pathloss reference signal to determine downlink path loss for compensation during uplink power control. The pathloss reference signal may be a synchronization signal/physical broadcast channel block ("synchronization signal block (SSB)" for short). The network device can indicate the SSB by an SSB index, where the SSB index is a transmit position of the SSB.

On an unlicensed spectrum, a communication device needs to follow a "listen before talk (LBT)" principle, that is, the communication device needs to perform channel listening before transmitting signals on an unlicensed spectrum channel, and the communication device can transmit signals only when the channel listening indicates that the channel is idle. If the channel listening of the communication device on the unlicensed spectrum channel indicates that the channel is busy, the communication device cannot transmit signals.

In an NR-unlicensed (NR-U) system, the network device can transmit an SSB only after successfully getting channel usufruct through LBT, that is, a transmit position of the SSB is uncertain. In this case, how the network device can indicate the pathloss reference signal to the terminal device is a problem worth studying.

SUMMARY

In a first aspect, a wireless communication method is provided. The method includes the following. A terminal device receives configuration information of a pathloss reference signal transmitted by a network device, where the configuration information of a pathloss reference signal includes SSB indication information, the SSB indication information is an SSB position index or an SSB QCL index, and the SSB indication information is used for determining a target pathloss reference signal. The terminal device measures the target pathloss reference signal to determine a path loss between the terminal device and the network device.

In a second aspect, a wireless communication method is provided. The method includes the following. A network device transmits configuration information of a pathloss reference signal to a terminal device, where the configuration information of a pathloss reference signal includes SSB indication information, the SSB indication information is an SSB position index or an SSB QCL index, the SSB indication information is used for determining a target pathloss reference signal, and the target pathloss reference signal is used for determining a path loss between the network device and the terminal device.

In a third aspect, a terminal device is provided. The terminal device includes a processor, a transceiver, and a memory. The memory is configured to store computer programs. The computer programs, when executed by the processor, are operable with the processor and/or transceiver to perform the method described in the first aspect or in any other implementation of the first aspect.

In a fourth aspect, a network device is provided. The network device includes a processor, a transceiver, and a memory. The memory is configured to store computer programs. The computer programs, when executed by the processor, are operable with the processor and/or transceiver to perform the method described in the second aspect or in any other implementation of the second aspect.

BRIEF DESCRIPTION OF DRAWINGS

FIG. 1 is a schematic diagram of an application scenario according to implementations of the disclosure.

FIG. 2 is a schematic diagram of a wireless communication method according to implementations of the disclosure.

DETAILED DESCRIPTION

Figure 3:
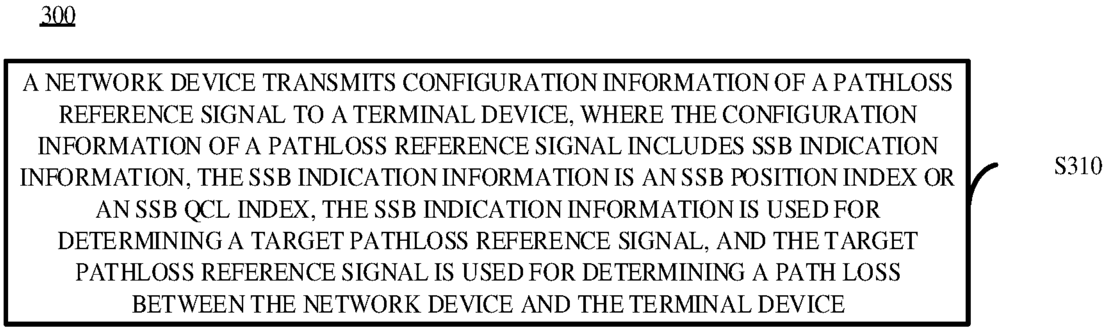
FIG. 3 is a schematic diagram of another wireless communication method according to implementations of the disclosure.

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations herein can also be applied to these communication systems.

Exemplarily, FIG. 1 illustrates a communication system 100 of implementations of the disclosure. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, terminal devices 120 can communicate with each other through D2D communication.

Optionally, the 5G system or 5G network can also be referred to as an NR system or NR network.

FIG. 1 exemplarily illustrates one network device and two terminal devices. Optionally, the communication system 100 may also include multiple network devices, and there can be other numbers of terminal devices in a coverage area of each of the network devices, which is not limited herein.

Optionally, the communication system 100 may further include other network entities such as a network controller, a mobile management entity, or the like, and the disclosure is not limited in this regard.

It should be understood that, a device with communication functions in a network/system of implementations can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In an NR system, a synchronization signal block (SSB) can be transmitted within a time-window having a certain size (such as 5 ms (millisecond)), and can be transmitted periodically. Such a period can be configured through a higher-layer parameter, i.e., SSB timing. For example, the period can be 5 ms, 10 ms, 20 ms, 40 ms, 80 ms, 160 ms. The terminal device can obtain an SSB index according to the SSB received. The SSB index corresponds to a relative position of the SSB in the time-window. The SSB index can be used for the terminal device to achieve frame synchronization. In addition, the SSB index can also be used for determining a quasi-co-location (QCL) relationship of the SSB. If SSBs received at different times have the same SSB index, these SSBs can be considered to be in a QCL relationship.

In an NR system, the network device can configure a pathloss reference signal for an uplink channel or for an uplink signal. The pathloss reference signal may be an SSB or a channel-state information-reference signal (CSI-RS). If the pathloss reference signal is an SSB, the network device can indicate the SSB by an SSB index.

On an unlicensed spectrum, channel resources are shared. In order to use these shared resources, the communication device has to find an idle channel through listening firstly. In this scenario, it is difficult to ensure periodic SSB transmission and reception at a fixed position. Since a timing position of LBT success of a transmit-end device is unpredictable, SSB transmission and reception is likely to fail as a result of LBT failure.

To this end, in an NR-unlicensed (NR-U) system, multiple candidate positions of SSBs ("SSB candidate position" for short) are provided, such that there are still sufficient SSB candidate positions used for SSB transmission after LBT succeeds, which can avoid SSB transmission and reception from being affected by LBT failure. Specifically, Y SSB candidate positions can be configured in one time-window, and up to Q SSBs can be transmitted at the Y SSB candidate positions, where Q<Y. In addition, the SSB(s) can be transmitted only after the transmit-end device obtains an available channel.

Since the terminal device needs to obtain frame synchronization through an SSB that is received at a candidate position, an SSB position index (that is, a transmit position index of an SSB) is defined for the candidate position, where a value range of the SSB position index is 0~Y−1. In addition, an SSB QCL index is further defined to obtain a QCL relationship of an SSB, where a value range of the SSB QCL index is 0~Q−1.

As an example, Q=8, and Y=20. The value range of the SSB position index carried by an SSB can be 0~19, such that the terminal device can obtain a transmit position of a received SSB for frame synchronization. Since up to 8 SSBs may be transmitted at 20 candidate positions, the value range of the SSB QCL index used for obtaining a QCL relationship between SSBs is 0~7. For SSBs transmitted at different time points, if the SSBs have the same SSB QCL index, the SSBs can be considered to be in a QCL relationship, and SSBs having different SSB QCL indexes are not in a QCL relationship. For example, if the value range of the SSB position index is 0~19, SSBs with SSB position indexes of 0, 8, and 16 are in a QCL relationship. The SSB QCL index may be a result of the SSB position index modulo parameter Q, that is, SSB QCL index=Mod (SSB position index, Q).

In an NR-U system, since the network device can transmit an SSB only after successfully getting channel usufruct through LBT, a transmit position of an SSB is uncertain. In this situation, how the network device can indicate a pathloss reference signal is a problem to be solved.

Implementations provide wireless communication methods, a terminal device, and a network device. As such, the terminal device can determine a pathloss reference signal according to a synchronization signal block (SSB) position index (that is, SSB transmit position index) or an SSB quasi-co-location (QCL) index in configuration information of a pathloss reference signal, thereby performing path loss measurement according to the pathloss reference signal.

FIG. 2 is a schematic diagram of a wireless communication method 200 according to implementations of the disclosure. The method 200 may be performed by the terminal device in the communication system illustrated in FIG. 1. As illustrated in FIG. 2, the method 200 includes at least some of the following operations.

S210, a terminal device receives configuration information of a pathloss reference signal transmitted by a network device, where the configuration information of a pathloss reference signal includes SSB indication information, the SSB indication information is an SSB position index or an SSB QCL index, and the SSB indication information is used for determining a target pathloss reference signal.

S220, the terminal device measures the target pathloss reference signal to determine a path loss between the terminal device and the network device.

Optionally, in the implementations of the disclosure, the pathloss reference signal may be an SSB or a CSI-RS. In implementations herein, only the SSB is taken as an example of the pathloss reference signal for elaboration. The method is also applicable to a scenario in which the pathloss reference signal is the CSI-RS.

Optionally, in some of the implementations of the disclosure, the pathloss reference signal may be a downlink reference signal, such as an SSB or a CSI-RS, which is used for determining the path loss between the terminal device and the network device. In other implementations of the disclosure, the pathloss reference signal may be a sidelink (SL) reference signal, which is used for determining an SL path loss between terminal devices. The following will take determination of the path loss between the terminal device and the network device as an example for elaboration, which however shall not constitute limitation to the disclosure.

Optionally, in the implementations of the disclosure, the path loss between the terminal device and the network device is used for the terminal device to determine a transmission power of an uplink signal or a transmission power of an uplink channel. Specifically, when determining an uplink transmission power, the terminal device may compensate the uplink transmission power according to the path loss, to determine a proper uplink transmission power, thereby improving uplink reception performance. It should be understood that, the terminal device may adopt an existing manner to determine the transmission power of the uplink signal or the transmission power of the uplink channel according to the path loss.

Optionally, in the implementations of the disclosure, the uplink signal may be a sounding reference signal (SRS), or may be other uplink signals.

Optionally, in the implementations of the disclosure, the uplink channel may be a physical uplink control channel (PUCCH) or a physical uplink shared channel (PUSCH).

Optionally, in the implementations of the disclosure, the configuration information of a pathloss reference signal includes the SSB indication information. The SSB indication information is the SSB position index or the SSB QCL index. The SSB position index or the SSB QCL index can be used for determining the pathloss reference signal.

A value range of the SSB position index is determined according to the number of candidate positions used for SSB transmission in one time-window.

Optionally, in the implementations of the disclosure, the time-window may be a transmission window for a discovery reference signal (DRS). For example, the size of the time-window may be 5 ms. The DRS may be used for the terminal device to access a network. The DRS may include an SSB.

Optionally, the number of candidate positions used for SSB transmission in one time-window is pre-configured, or determined according to a parameter configured by the network device. In some implementations, the parameter configured by the network device includes a size of the time-window and a subcarrier spacing (SCS) of an SSB.

For example, if the time-window has a size of 5 ms, and the SCS of an SSB is 30 kHz (kilohertz), the number of candidate positions may be 20.

For another example, if the time-window has a size of 5 ms, and the SCS of an SSB is 15 kHz, the number of candidate positions may be 10.

Optionally, in some of the implementations, the number of candidate positions used for SSB transmission in one time-window may correspond to the number of candidate positions Y in the foregoing descriptions.

Optionally, in some of the implementations of the disclosure, the SSB position index may correspond to the SSB position index in the foregoing descriptions, where the SSB position index can be indicative of a transmit position of an SSB in one time-window.

Optionally, in the implementations of the disclosure, the SSB QCL index can be used for determining a QCL relationship of an SSB. In some implementations, SSBs having the same SSB QCL index can be considered to be in a QCL relationship, and SSBs having different SSB QCL indexes can be considered not to be in a QCL relationship.

In some implementations, the SSB QCL index is a result of the SSB position index modulo parameter Q, where the parameter Q is used for determining a QCL relationship of an SSB. Optionally, the time-window may be a transmission window for a DRS, for example, a 5 ms window.

Optionally, in one of the implementations of the disclosure, the parameter Q is a maximum number of SSBs that are not in a QCL relationship and are transmitted in one time-window. For example, parameter Q may also be other parameters used for determining a QCL relationship of an SSB.

Optionally, the parameter Q may be pre-configured, or may be indicated by the network device, for example, the network device can configure parameter Q through higher-layer signaling.

The following will describe in detail the manners of determining the pathloss reference signal when the SSB indication information is the SSB position index or the SSB QCL index. For the convenience of distinction and description, the following manners are respectively marked as embodiment 1 and embodiment 2.

Embodiment 1: The SSB Indication Information Indicates the SSB Position Index In embodiment 1, the terminal device can determine an SSB with an SSB position index satisfying a preset condition as the pathloss reference signal.

Optionally, in one of the implementations of the disclosure, "the SSB position index satisfies the preset condition" may mean that a result of an SSB position index corresponding to the pathloss reference signal (represented by SSB position index_ck) modulo parameter Q is the same as that of the SSB position index indicated by the SSB indication information (represented by SSB position index_s) modulo parameter Q, that is, Mod (SSB position index_ck, Q)=Mod (SSB position index_s, Q).

In one of the implementations of the disclosure, after receiving the SSB indication information, the terminal device can perform a modulo (abbreviated as Mod) operation on the SSB position index indicated by the SSB indication information and parameter Q to obtain a result of Mod operation (that is, Mod (SSB position index_s, Q)), and then determines a target SSB position index which has the same result of Mod operation, thereby determining an SSB corresponding to the target SSB position index as the pathloss reference signal.

For example, Y=20, and Q=8. If the SSB position index indicated by the SSB indication information is 12, the terminal device can determine an SSB having an SSB position index of 4 or 12 as the pathloss reference signal, thus measuring the pathloss reference signal to determine the path loss between the terminal device and the network device.

In another one of the implementations of the disclosure, "the SSB position index satisfies the preset condition" may mean that the SSB position index corresponding to the pathloss reference signal and the SSB position index indicated by the SSB indication information belong to the same subset. SSBs corresponding to SSB position indexes in the subset are in a QCL relationship.

Specifically, SSB position indexes can be divided into multiple subsets. For each of the multiple subsets, SSBs corresponding to SSB position indexes in the subset are in a QCL relationship. SSBs corresponding to SSB position indexes in different subsets are not in a QCL relationship. After receiving the SSB indication information, the terminal device can determine a subset to which the SSB position index indicated by the SSB indication information belongs, and select the target SSB position index from the subset, thereby determining an SSB corresponding to the target SSB position index as the pathloss reference signal.

Optionally, in this implementation, the result of each of SSB position indexes in the same subset modulo parameter Q is the same. The result of each of SSB position indexes in different subsets modulo parameter Q is different.

The number of the subsets may be Q. As an example, Y=20, and Q=8, that is, 20 SSB position indexes can be classified into 8 subsets. For example, SSB position indexes of 0, 8, and 16 belong to subset 0, SSB position indexes of 4 and 12 belong to subset 4, etc.

Exemplarily, if the SSB position index indicated by the SSB indication information is 12, the terminal device can decide to select the target SSB position index from subset 4, for example, determine an SSB with an SSB position index of 4 or 12 as the pathloss reference signal. As such, the terminal device can measure the pathloss reference signal to obtain a path loss value between the terminal device and the network device.

Embodiment 2: The SSB Indication Information Indicates the SSB QCL Index

In embodiment 2, the terminal device can determine an SSB with an SSB QCL index satisfying a preset condition as the pathloss reference signal.

Optionally, as one of the implementations of the disclosure, "the SSB QCL index satisfies the preset condition" may mean that an SSB QCL index of the pathloss reference signal is the same as the SSB QCL index indicated by the SSB indication information.

Optionally, in some of the implementations of the disclosure, after receiving the SSB indication information, the terminal device can determine an SSB with the same SSB QCL index as that indicated by the SSB indication information as the pathloss reference signal.

For example, Y=20, and Q=8. If the SSB QCL index indicated by the SSB indication information is 4, the terminal device determines an SSB with an SSB QCL index of 4 as the pathloss reference signal, thereby measuring the pathloss reference signal to obtain a path loss value between the terminal device and the network device.

Optionally, in other implementations of the disclosure, after receiving the SSB indication information, the terminal device can obtain an SSB QCL index, and determine at least one SSB position index according to the SSB QCL index obtained, where a result of any of the at least one SSB position index modulo parameter Q is the SSB QCL index. In this way, the terminal device can determine the target SSB position index from the at least one SSB position index.

For example, Y=20, and Q=8. If the SSB QCL index indicated by the SSB indication information is 4, the terminal device can determine that an SSB position index of the pathloss reference signal is 4 or 12, and determine an SSB having an SSB position index of 4 or 12 as the pathloss reference signal. In this way, the terminal device can measure the pathloss reference signal to obtain a path loss value between the terminal device and the network device.

Therefore, according to the method provided in implementations of the disclosure, the terminal device can correctly determine, according to the SSB position index or the SSB QCL index in the configuration information of the pathloss reference signal, the pathloss reference signal used for path loss measurement, to perform path loss measurement according to the determined pathloss reference signal, which is possible to determine a proper uplink transmission power, thereby improving reception performance of an uplink signal or an uplink channel.

The wireless communication method according to implementations of the disclosure has been described in detail above from the perspective of a terminal device in connection with FIG. 2. The following will describe in detail another wireless communication method according to implementations of the disclosure from the perspective of a network device in connection with FIG. 3. It should be understood that, descriptions on a network device side and descriptions on a terminal device side correspond to each other. For similar descriptions, reference can be made to the foregoing descriptions, which will not be described again herein to avoid repetition.

With the above technical solutions, the terminal device can correctly determine a pathloss reference signal used for path loss measurement, according to the SSB position index or the SSB QCL index in the configuration information of a pathloss reference signal. As such, the terminal device can perform path loss measurement according to the determined pathloss reference signal, which is possible to determine a proper uplink transmission power, thereby improving reception performance of an uplink signal or an uplink channel.

FIG. 3 is a schematic diagram of another wireless communication method 300 according to implementations of the disclosure. The method 300 may be performed by the network device in the communication system illustrated in FIG. 1. As illustrated in FIG. 3, the method 300 includes the following.

S310, a network device transmits configuration information of a pathloss reference signal to a terminal device, where the configuration information of a pathloss reference signal includes SSB indication information, the SSB indication information is an SSB position index or an SSB QCL index, the SSB indication information is used for determining a target pathloss reference signal, and the target pathloss reference signal is used for determining a path loss between the network device and the terminal device.

Optionally, in some of the implementations of the disclosure, the SSB indication information indicates the SSB position index, and a result of an SSB position index corresponding to the target pathloss reference signal modulo parameter Q is the same as that of the SSB position index indicated by the SSB indication information modulo parameter Q, where the parameter Q is used for determining a QCL relationship of an SSB.

Optionally, in some of the implementations of the disclosure, the SSB position index belongs to a first subset among multiple subsets, for each of the multiple subsets, SSBs corresponding to SSB position indexes in the subset are in a QCL relationship, and SSBs corresponding to SSB position indexes in different subsets are not in a QCL relationship.

Optionally, in some of the implementations of the disclosure, an SSB position index corresponding to the target pathloss reference signal and an SSB position index indicated by the SSB indication information belong to the same subset.

Optionally, in some of the implementations of the disclosure, results of each of SSB position indexes in the same subset modulo parameter Q are the same, where the parameter Q is used for determining a QCL relationship of an SSB.

Optionally, in other implementations of the disclosure, the SSB indication information indicates the SSB QCL index, and an SSB QCL index corresponding to the target pathloss reference signal is the same as the SSB QCL index indicated by the SSB indication information.

Optionally, in some of the implementations of the disclosure, SSBs having the same SSB QCL index are in a QCL relationship, and SSBs having different SSB QCL indexes are not in a QCL relationship.

Optionally, in some of the implementations of the disclosure, the SSB QCL index is a result of the SSB position index modulo parameter Q, where the parameter Q is used for determining a QCL relationship of an SSB.

Optionally, in some of the implementations of the disclosure, the path loss is used for the terminal device to determine a transmission power of an uplink channel or a transmission power of an uplink signal.

Optionally, in some of the implementations of the disclosure, the uplink channel includes a PUCCH and/or a PUSCH, and the uplink signal includes an SRS.

Optionally, in some of the implementations of the disclosure, a value range of the SSB position index is determined according to the number of candidate positions used for SSB transmission in one time-window.

Optionally, in some of the implementations of the disclosure, the number of candidate positions used for SSB transmission in one time-window is pre-configured, or determined according to a parameter configured by the network device.

Optionally, in some of the implementations of the disclosure, the parameter configured by the network device includes a size of the time-window and an SCS of an SSB.

Optionally, in some of the implementations of the disclosure, the parameter Q may be pre-configured, or may be indicated by the network device.

Optionally, in some of the implementations of the disclosure, the parameter Q is a maximum number of SSBs that are transmitted in one time-window and are not in a QCL relationship.

Method implementations of the disclosure have been described in detail above with reference to FIG. 2 and FIG. 3. The following will described in detail device/apparatus implementations of the disclosure with reference to FIG. 4 to FIG. 7. It should be understood that, device/apparatus implementations and method implementations correspond to each other. For similar descriptions, reference can be made to the foregoing method implementations.

Figure 4:
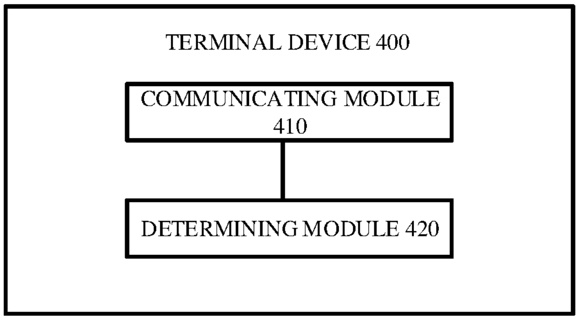
FIG. 4 is a schematic block diagram of a terminal device according to implementations of the disclosure.

FIG. 4 is a schematic block diagram of a terminal device 400 according to implementations of the disclosure. As illustrated in FIG. 4, the terminal device 400 includes a communicating module 410 and a determining module 420. The communicating module 410 is configured to receive configuration information of a pathloss reference signal transmitted by a network device, where the configuration information of a pathloss reference signal includes SSB indication information, the SSB indication information is an SSB position index or an SSB QCL index, and the SSB indication information is used for determining a target pathloss reference signal. The determining module 420 is configured to measure the target pathloss reference signal to determine a path loss between the terminal device and the network device.

Optionally, in some of the implementations of the disclosure, the SSB indication information indicates the SSB position index, and a result of an SSB position index corresponding to the target pathloss reference signal modulo parameter Q is the same as that of the SSB position index indicated by the SSB indication information modulo parameter Q, where the parameter Q is used for determining a QCL relationship of an SSB.

Optionally, in some of the implementations of the disclosure, the SSB position index belongs to a first subset among multiple subsets, for each of the multiple subsets, SSBs corresponding to SSB position indexes in the subset are in a QCL relationship, and SSBs corresponding to SSB position indexes in different subsets are not in a QCL relationship.

Optionally, in some of the implementations of the disclosure, an SSB position index corresponding to the target pathloss reference signal and an SSB position index indicated by the SSB indication information belong to the same subset.

Optionally, in some of the implementations of the disclosure, results of each of SSB position indexes in the same subset modulo parameter Q are the same, where the parameter Q is used for determining a QCL relationship of an SSB.

Optionally, in other implementations of the disclosure, the SSB indication information indicates the SSB QCL index, and an SSB QCL index corresponding to the target pathloss reference signal is the same as the SSB QCL index indicated by the SSB indication information.

Optionally, in some of the implementations of the disclosure, SSBs having the same SSB QCL index are in a QCL relationship, and SSBs having different SSB QCL indexes are not in a QCL relationship.

Optionally, in some of the implementations of the disclosure, the SSB QCL index is a result of the SSB position index modulo parameter Q, where the parameter Q is used for determining a QCL relationship of an SSB.

Optionally, in some of the implementations of the disclosure, the determining module 420 is further configured to determine a transmission power of an uplink channel or a transmission power of an uplink signal according to the path loss.

Optionally, in some of the implementations of the disclosure, the uplink channel includes a PUCCH and/or a PUSCH, and the uplink signal includes an SRS.

Optionally, in some of the implementations of the disclosure, a value range of the SSB position index is determined according to the number of candidate positions used for SSB transmission in one time-window.

Optionally, in some of the implementations of the disclosure, the number of candidate positions used for SSB transmission in one time-window is pre-configured, or determined according to a parameter configured by the network device.

Optionally, in some of the implementations of the disclosure, the parameter configured by the network device includes a size of the time-window and an SCS of an SSB.

Optionally, in some of the implementations of the disclosure, parameter Q may be pre-configured, or may be indicated by the network device.

Optionally, in some of the implementations of the disclosure the parameter Q is a maximum number of SSBs that are transmitted in one time-window and are not in a QCL relationship.

It should be understood that, the terminal device 400 according to implementations of the disclosure may correspond to the terminal device in the foregoing method implementations of the disclosure, and the above and other operations and/or functions implemented by various units of the terminal device 400 are respectively intended for implementing corresponding operations of the terminal device in the method 200 illustrated in FIG. 2, which will not be repeated herein for the sake of simplicity.

Figure 5:
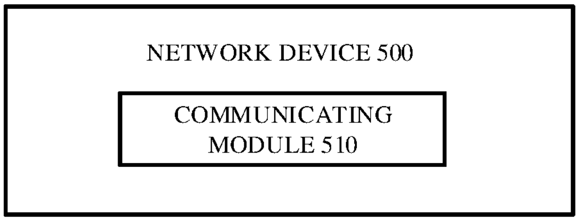
FIG. 5 is a schematic block diagram of a network device according to implementations of the disclosure.

FIG. 5 is a schematic block diagram of a network device according to implementations of the disclosure. As illustrated in FIG. 5, the network device 500 includes a communicating module 510. The communicating module 510 is configured to transmit configuration information of a pathloss reference signal to a terminal device, where the configuration information of a pathloss reference signal includes SSB indication information, the SSB indication information is an SSB position index or an SSB QCL index, the SSB indication information is used for determining a target pathloss reference signal, and the target pathloss reference signal is used for determining a path loss between the network device and the terminal device.

Optionally, in some of the implementations of the disclosure, the SSB indication information indicates the SSB position index, and a result of an SSB position index corresponding to the target pathloss reference signal modulo parameter Q is the same as that of the SSB position index indicated by the SSB indication information modulo parameter Q, where the parameter Q is used for determining a QCL relationship of an SSB.

Optionally, in some of the implementations of the disclosure, the SSB position index belongs to a first subset among multiple subsets, for each of the multiple subsets, SSBs corresponding to SSB position indexes in the subset are in a QCL relationship, and SSBs corresponding to SSB position indexes in different subsets are not in a QCL relationship.

Optionally, in some of the implementations of the disclosure, an SSB position index corresponding to the target pathloss reference signal and an SSB position index indicated by the SSB indication information belong to the same subset.

Optionally, in some of the implementations of the disclosure, results of each of SSB position indexes in the same subset modulo parameter Q are the same, where the parameter Q is used for determining a QCL relationship of an SSB.

Optionally, in other implementations of the disclosure, the SSB indication information indicates the SSB QCL index, and an SSB QCL index corresponding to the target pathloss reference signal is the same as the SSB QCL index indicated by the SSB indication information.

Optionally, in some of the implementations of the disclosure, SSBs having the same SSB QCL index are in a QCL relationship, and SSBs having different SSB QCL indexes are not in a QCL relationship.

Optionally, in some of the implementations of the disclosure, the SSB QCL index is a result of the SSB position index modulo parameter Q, where the parameter Q is used for determining a QCL relationship of an SSB.

Optionally, in some of the implementations of the disclosure, the path loss is used for the terminal device to determine a transmission power of an uplink channel or a transmission power of an uplink signal.

Optionally, in some of the implementations of the disclosure, the uplink channel includes a PUCCH and/or a PUSCH, and the uplink signal includes an SRS.

Optionally, in some of the implementations of the disclosure, a value range of the SSB position index is determined according to the number of candidate positions used for SSB transmission in one time-window.

Optionally, in some of the implementations of the disclosure, the number of candidate positions used for SSB transmission in one time-window is pre-configured, or determined according to a parameter configured by the network device.

Optionally, in some of the implementations of the disclosure, the parameter configured by the network device includes a size of the time-window and an SCS of an SSB.

Optionally, in some of the implementations of the disclosure, parameter Q may be pre-configured, or may be indicated by the network device.

Optionally, in some of the implementations of the disclosure, the parameter Q is a maximum number of SSBs that are transmitted in one time-window and are not in a QCL relationship.

It should be understood that, the network device 500 according to implementations of the disclosure may correspond to the network device in the foregoing method implementations of the disclosure, and the above and other operations and/or functions implemented by various units of the network device 500 are respectively intended for implementing corresponding operations of the network device in the method 300 illustrated in FIG. 3, which will not be repeated herein for the sake of simplicity.

Figure 6:
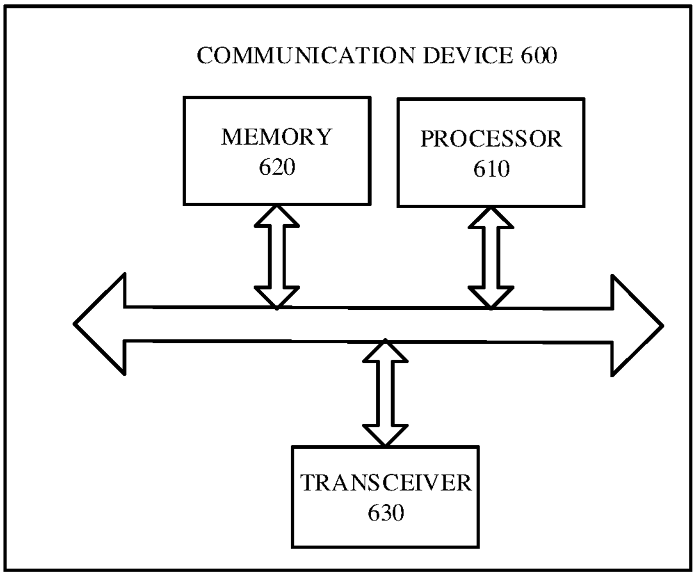
FIG. 6 is a schematic block diagram of a communication device according to implementations of the disclosure.

FIG. 6 is a schematic structural diagram of a communication device 600 according to implementations of the disclosure. As illustrated in FIG. 6, the communication device 600 includes a processor 610. The processor 610 can invoke and execute computer programs stored in a memory to perform the method provided in implementations.

Optionally, as illustrated in FIG. 6, the communication device 600 can further include the memory 620. The processor 610 can invoke and execute the computer programs stored in the memory 620 to perform the method provided in implementations.

The memory 620 may be a separate device independent of the processor 610, or may be integrated into the processor 610.

Optionally, as illustrated in FIG. 6, the communication device 600 can further include a transceiver 630. The processor 610 can control the transceiver 630 to communicate with other devices, for example, to send information or data to other devices, or to receive information or data from other devices.

The transceiver 630 may include a transmitter and a receiver. The transceiver 630 may further include an antenna, where one or more antenna can be provided.

Optionally, the communication device 600 may be operable as the network device of implementations, and the communication device 600 can implement the operations performed by the network device described in the foregoing method implementations, which will not be repeated herein for the sake of simplicity.

Optionally, the communication device 600 may be operable as the mobile terminal/the terminal device of implementations, and the communication device 600 can implement the operations performed by the mobile terminal/the terminal device described in the foregoing method implementations, which will not be repeated herein for the sake of simplicity.

Figure 7:
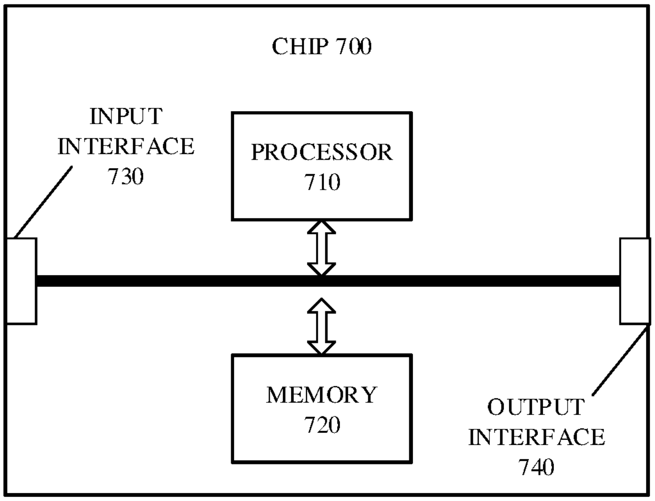
FIG. 7 is a schematic block diagram of a chip according to implementations of the disclosure.

FIG. 7 is a schematic structural diagram of a chip according to implementations of the disclosure. As illustrated in FIG. 7, the chip 700 includes a processor 710. The processor 710 is configured to invoke and execute computer programs stored in a memory to perform the method provided in implementations.

Optionally, as illustrated in FIG. 7, the chip 700 further includes the memory 720. The processor 710 can invoke and execute the computer programs stored in the memory 720 to perform the method provided in implementations.

The memory 720 may be a separate device independent of the processor 710, or may be integrated into the processor 710.

Optionally, the chip 700 may further include an input interface 730. The processor 710 can control the input interface 730 to communicate with other devices or chips, for example, to acquire information or data sent by other devices or chips.

Optionally, the chip 700 may further include an output interface 740. The processor 710 can control the output interface 740 to communicate with other devices or chips, for example, to output information or data to other devices or chips.

Optionally, the chip is applicable to the network device of implementations. The chip can implement the operations performed by the network device described in the foregoing method implementations, which will not be repeated herein for the sake of simplicity.

Optionally, the chip is applicable to the mobile terminal/the terminal device. The chip can implement the operations performed by the mobile terminal/the terminal device described in the foregoing method implementations, which will not be repeated herein for the sake of simplicity.

It should be understood that, the chip herein may also be referred to as a system-on-chip (SOC).

Implementations further provide a schematic block diagram of a communication system. The communication system includes a terminal device and a network device. The terminal device can implement functions of the terminal device described in the foregoing method implementations, and the network device can implement functions of the network device described in the foregoing method implementations, which will not be repeated herein for the sake of simplicity.

It should be understood that, the processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Implementations further provide a computer readable storage medium. The computer readable storage medium is configured to store computer programs.

Optionally, the computer readable storage medium is applicable to the network device of implementations. The computer programs, when executed, are operable with a computer to implement the operations performed by the network device described in the foregoing method implementations, which will not be repeated herein for the sake of simplicity.

Optionally, the computer readable storage medium is applicable to the mobile terminal/the terminal device. The computer programs, when executed, are operable with a computer to implement the operations performed by the mobile terminal/the terminal device described in the foregoing method implementations, which will not be repeated herein for the sake of simplicity.

Implementations further provide a computer program product. The computer program product includes computer program instructions.

Optionally, the computer program product is applicable to the network device of implementations. The computer program instructions, when executed, are operable with a computer to implement the operations performed by the network device described in the foregoing method implementations, which will not be repeated herein for the sake of simplicity.

Optionally, the computer program product is applicable to the mobile terminal/the terminal device. The computer program instructions, when executed, are operable with a computer to implement the operations performed by the mobile terminal/the terminal device described in the foregoing method implementations, which will not be repeated herein for the sake of simplicity.

Implementations further provide a computer program.

Optionally, the computer program is applicable to the network device of implementations. The computer program, when executed by a computer, is operable with the computer to implement the operations performed by the network device described in the foregoing method implementations, which will not be repeated herein for the sake of simplicity.

Optionally, the computer program is applicable to the mobile terminal/the terminal device. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of wireless communication, comprising:

receiving, by a terminal device, synchronization signal block (SSB) quasi-co-location (QCL) index carried in a configuration information of a pathloss reference signal from a network device;

wherein an SSB position index is determined according to the SSB QCL index, wherein a value range of the SSB position index is determined according to a number of candidate positions used for SSB transmission in one time-window, the number of candidate positions used for SSB transmission in one time-window is determined according to a parameter configured by the network device; wherein the parameter configured by the network device comprises a size of the time-window and a subcarrier spacing (SCS) of the SSB;

identifying, from a plurality of candidate SSBs in the time-window, a candidate SSB that has the SSB QCL index as a target pathloss reference signal; and measuring, by the terminal device, the target pathloss reference signal to determine a path loss between the terminal device and a network device.

2. The method of claim 1, wherein SSBs having a same SSB QCL index are in a QCL relationship, and SSBs having different SSB QCL indexes are not in a QCL relationship.

3. The method of claim 2, wherein the SSB carries the SSB position index, for the terminal device to obtain a transmit position of the SSB.

4. The method of claim 1, wherein the SSB QCL index is a result of a modulo operation on the SSB position index and a parameter Q, wherein the parameter Q is used for determining a QCL relationship of an SSB, and is a maximum number of SSBs that are transmitted in one time-window and are not in a QCL relationship.

5. The method of claim 1, further comprising:

determining, by the terminal device, a transmission power of an uplink channel or a transmission power of an uplink signal according to the path loss, wherein the uplink channel comprises a physical uplink control channel (PUCCH) and/or a physical uplink shared channel (PUSCH), and the uplink signal comprises a sounding reference signal (SRS).

6. A method of wireless communication, comprising:

transmitting, by a network device, configuration information of a pathloss reference signal to a terminal device, wherein the configuration information carries synchronization signal block (SSB) quasi-co-location (QCL) index;

wherein an SSB position index is determined according to the SSB QCL index, wherein a value range of the SSB position index is determined according to a number of candidate positions used for SSB transmission in one time-window, the number of candidate positions used for SSB transmission in one time-window is determined according to a parameter configured by the network device; wherein the parameter configured by the network device comprises a size of the time-window and a subcarrier spacing (SCS) of the SSB;

wherein from a plurality of candidate SSBs in the time-window, a candidate SSB with the SSB QCL index is identified as a target pathloss reference signal at the terminal device, and the target pathloss reference signal is used for determining a path loss between the network device and the terminal device.

7. The method of claim 6, wherein SSBs having a same SSB QCL index are in a QCL relationship, and SSBs having different SSB QCL indexes are not in a QCL relationship.

8. The method of claim 6, wherein the SSB QCL index is a result of a modulo operation on the SSB position index and a parameter Q, wherein the parameter Q is used for determining a QCL relationship of an SSB, and the parameter Q is a maximum number of SSBs that are transmitted in one time-window and are not in a QCL relationship.

9. A terminal device, comprising:

a processor;

a transceiver; and a memory configured to store computer programs which, when executed by the processor, are operable with the transceiver to receive synchronization signal block (SSB) quasi-co-location (QCL) index carried in a configuration information of a pathloss reference signal from a network device;

wherein an SSB position index is determined according to the SSB QCL index, wherein a value range of the SSB position index is determined according to a number of candidate positions used for SSB transmission in one time-window, the number of candidate positions used for SSB transmission in one time-window is determined according to a parameter configured by the network device; wherein the parameter configured by the network device comprises a size of the time-window and a subcarrier spacing (SCS) of the SSB;

the computer programs, when executed by the processor, are operable with the processor to identify, from a plurality of candidate SSBs in the time-window, a candidate SSB with the SSB QCL index as a target pathloss reference signal, and measure the target pathloss reference signal to determine a path loss between the terminal device and a network device.

10. The terminal device of claim 9, wherein SSBs having a same SSB QCL index are in a QCL relationship, and SSBs having different SSB QCL indexes are not in a QCL relationship.

11. The terminal device of claim 10, wherein the SSB carries an SSB position index, for the terminal device to obtain a transmit position of the SSB.

12. The terminal device of claim 9, wherein the SSB QCL index is a result of a modulo operation on the SSB position index and a parameter Q, wherein the parameter Q is used for determining a QCL relationship of an SSB, and is a maximum number of SSBs that are transmitted in one time-window and are not in a QCL relationship.

13. The terminal device of claim 9, wherein the computer programs, when executed by the processor, are operable with the processor to:

determine a transmission power of an uplink channel or a transmission power of an uplink signal according to the path loss, wherein the uplink channel comprises a physical uplink control channel (PUCCH) and/or a physical uplink shared channel (PUSCH), and the uplink signal comprises a sounding reference signal (SRS).

14. A network device, comprising:

a processor;

a transceiver; and a memory configured to store computer programs which, when executed by the processor, are operable with the transceiver to transmit configuration information of a pathloss reference signal to a terminal device, wherein the configuration information carries synchronization signal block (SSB) quasi-co-location (QCL) index;

wherein SSB position index is determined according to the SSB QCL index, wherein a value range of the SSB position index is determined according to a number of candidate positions used for SSB transmission in one time-window, the number of candidate positions used for SSB transmission in one time-window is determined according to a parameter configured by the network device; wherein the parameter configured by the network device comprises a size of the time-window and a subcarrier spacing (SCS) of the SSB;

wherein from a plurality of candidate SSBs in the time-window, a candidate SSB with the SSB index is determined as a target pathloss reference signal at the terminal device, and the target pathloss reference signal is used for determining a path loss between the network device and the terminal device.

15. The network device of claim 14, wherein SSBs having same SSB QCL index are in a QCL relationship, and SSBs having different SSB QCL indexes are not in a QCL relationship.

16. The network device of claim 14, wherein the SSB QCL index is a result of a modulo operation on the SSB position index and a parameter Q, wherein the parameter Q is used for determining a QCL relationship of an SSB, wherein the path loss is used for the terminal device to determine a transmission power of an uplink channel or a transmission power of an uplink signal.

* * * * *